US012666337B2

(12) United States Patent
Awada et al.

(10) Patent No.: US 12,666,337 B2
(45) Date of Patent: Jun. 23, 2026

(54) APPARATUSES, METHODS, AND COMPUTER PROGRAMS FOR USER EQUIPMENTS AND NETWORK NODES

(71) Applicant: Nokia Technologies Oy, Espoo (FI)

(72) Inventors: Ahmad Awada, Munich (DE); Bernhard Wegmann, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 288 days.

(21) Appl. No.: 18/493,551

(22) Filed: Oct. 24, 2023

(65) Prior Publication Data

US 2024/0163766 A1    May 16, 2024

(30) Foreign Application Priority Data

Nov. 10, 2022    (FI) ..................................... 20226011

(51) Int. Cl.
| | |
|---|---|
| *H04W 36/36* | (2009.01) |
| *H04W 36/00* | (2009.01) |
| *H04W 36/30* | (2009.01) |

(52) U.S. Cl.
CPC ..... *H04W 36/362* (2023.05); *H04W 36/0072* (2013.01); *H04W 36/30* (2013.01)

(58) Field of Classification Search
CPC ........... H04W 36/362; H04W 36/0072; H04W 36/30
See application file for complete search history.

(56) References Cited

FOREIGN PATENT DOCUMENTS

| WO | 2021/138662 A1 | 7/2021 |
| WO | 2022/010398 A1 | 1/2022 |
| WO | 2022/029709 A1 | 2/2022 |
| WO | WO-2022/141470 A1 | 7/2022 |

OTHER PUBLICATIONS

"Introduction of CPA and inter-SN CPC", 3GPP TSG-RAN WG2 Meeting #116-e, R2-2111640, CATT, Nov. 1-12, 2021, 34 pages.
"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331, V17.1.0, Jun. 2022, pp. 1-1128.
"Msc-generator", Sourceforge, Retrieved on Oct. 31, 2023, Webpage available at : https://sourceforge.net/projects/msc-generator/.

(Continued)

*Primary Examiner* — Ronald B Abelson
(74) *Attorney, Agent, or Firm* — BURR & FORMAN LLP

(57) ABSTRACT
There is provided a method, apparatus and computer program for causing an apparatus for a first network node to perform: for a first network node, the method comprising: preparing a first set of conditions for a user equipment to autonomously execute during a Conditional PSCell addition, CPA, and/or a Conditional PSCell change, CPC, wherein the first set of conditions comprises at least one first execution condition associated with a quality of a radio network environment to be experienced by the user equipment, and at least one second execution condition associated with a momentary traffic that the user equipment has to transmit and/or receive; and signalling the first set of conditions to the user equipment.

19 Claims, 10 Drawing Sheets

(56) References Cited

OTHER PUBLICATIONS

"3rd Generation Partnership Project; Technical Specification Group Radio Access Network; NR; Physical layer procedures for control (Release 16)", 3GPP TS 38.213, V16.2.0, Jun. 2020, pp. 1-176.

Office action received for corresponding Finnish Patent Application No. 20226011, dated Mar. 24, 2023, 17 pages.

"UE procedures and signalling for CPAC", 3GPP TSG-RAN WG2 #115-e, R2-2108113, Agenda: 8.2.3.2, Ericsson, Aug. 9-27, 2021, 14 pages.

"3rd Generation Partnership Project; Technical Specification Group Radio Access Network; Evolved Universal Terrestrial Radio Access (E-UTRA) and NR; Multi-connectivity; Stage 2 (Release 17)", 3GPP TS 37.340, V17.2.0, Sep. 2022, pp. 1-112.

"3rd Generation Partnership Project; Technical Specification Group Radio Access Network; NR; Requirements for support of radio resource management (Release 17)", 3GPP TS 38.133, V17.3.0, Sep. 2021, 3206 pages.

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

"Revised WID on Further NR mobility enhancements", 3GPP TSG RAN Meeting #98-e, RP-223520, Agenda: 9.3.2.1, MediaTek Inc, Dec. 12-16, 2022, 5 pages.

APPARATUSES, METHODS, AND COMPUTER PROGRAMS FOR USER EQUIPMENTS AND NETWORK NODES

FIELD OF THE DISCLOSURE

The examples described herein generally relate to apparatus, methods, and computer programs, and more particularly (but not exclusively) to apparatus, methods and computer programs for apparatuses.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to a first aspect, there is provided a method for a user equipment, the method comprising: configuring, at the user equipment, a first set of conditions for autonomously executing a secondary link establishment during a Conditional PSCell addition, CPA, and/or a Conditional PSCell change, CPC, wherein the first set of conditions comprises at least one first execution condition associated with a quality of a radio network environment to be experienced by the user equipment, and at least one second execution condition associated with a momentary traffic that the user equipment has to transmit and/or receive; evaluating whether the at least one first execution condition has been fulfilled; evaluating whether the at least one second execution condition has been fulfilled; and abstaining from executing the secondary link establishment until the at least one second execution condition is fulfilled simultaneously with the at least one first execution condition.

The method may comprise: in response to evaluating that the at least one second execution condition is fulfilled when the at least one first execution condition is fulfilled: identifying a target cell associated with the first set of conditions; and performing a random access procedure with the target cell.

Evaluating whether the at least one second execution condition has been fulfilled may comprise determining whether the user equipment has traffic to transmit to a network, and/or determining whether the user equipment is expecting to receive traffic from the network.

Said configuring the first set of conditions may comprise: receiving a first configuration comprising the first set of conditions from a first network node; and implementing the first configuration.

The method may comprise receiving the configuration comprising the first set of conditions in radio resource control reconfiguration signalling.

Said configuring the first set of conditions may comprise: receiving the at least one first execution condition in different signalling to said at least one second execution condition; and implementing the at least one first execution condition and said at least one second execution condition.

Said at least one second execution condition may be received via at least one a system information broadcast or via non-access stratum signalling.

The at least one first execution condition may comprise an entry condition and a leaving condition, and wherein the at least one first execution condition may be fulfilled when, subsequent to the entry condition being fulfilled, the leaving condition has not been fulfilled.

The entry condition may comprise a duration of time for which the quality of the radio network environment measured by the user equipment should exceed a predetermined threshold amount in order for the at least one first condition to be fulfilled.

According to a second aspect, there is provided a method for a first network node, the method comprising: preparing a first set of conditions for a user equipment to autonomously implement during a Conditional PSCell addition, CPA, and/or a Conditional PSCell change, CPC, wherein the first set of conditions comprises at least one first execution condition associated with a quality of a radio network environment to be experienced by the user equipment, and at least one second execution condition associated with a momentary traffic that the user equipment has to transmit and/or receive; and signalling the first set of conditions to the user equipment.

The preparing may comprise: signalling, to a second network node, a request comprising an indication of a plurality of cells that may be prepared for the user equipment in advance of the primary secondary cell change operation; receiving, from the second network node, respective indications of at least one cell of said plurality of cells, each of said selected cells having a respective associated at least one first execution condition; and forming the first set using the selected cells and their respective associated at least one first execution condition.

Said signalling the first set of conditions may comprise signalling the at least one first execution condition to the user equipment while using different signalling for signalling said at least one second execution condition.

Said signalling the first set of conditions may comprise signalling both the at least one first execution condition to the user equipment and said at least one second execution condition to the user equipment.

The method may comprise signalling the configuration comprising the first set of conditions in radio resource control reconfiguration signalling.

The at least one first execution condition may comprise an entry condition and a leaving condition, and wherein the at least one first execution condition may be fulfilled when, subsequent to the entry condition being fulfilled, the leaving condition has not been fulfilled.

The entry condition may comprise a duration of time for which the quality of the radio network environment measured by the user equipment should exceed a predetermined threshold amount in order for the at least one first condition to be fulfilled.

The at least one first execution condition may comprise an entry condition and a leaving condition, and wherein the at least one first execution condition may be fulfilled when, subsequent to the entry condition being fulfilled, the leaving condition has not been fulfilled.

The entry condition may comprise a duration of time for which the quality of the radio network environment measured by the user equipment should exceed a predetermined threshold amount in order for the at least one first condition to be fulfilled.

According to a third aspect, there is provided an apparatus for a user equipment, the apparatus comprising means for: configuring, at the user equipment, a first set of conditions for autonomously executing a secondary link establishment during a Conditional PSCell addition, CPA, and/or a Conditional PSCell change, CPC, wherein the first set of conditions comprises at least one first execution condition associated with a quality of a radio network environment to be experienced by the user equipment, and at least one second execution condition associated with a momentary traffic that the user equipment has to transmit and/or receive; evaluating whether the at least one first execution condition has been fulfilled; evaluating whether the at least one second execution condition has been fulfilled; and abstaining from executing the secondary link establishment until the at least one second execution condition is fulfilled simultaneously with the at least one first execution condition.

The apparatus may comprise means for: in response to evaluating that the at least one second execution condition is fulfilled when the at least one first execution condition is fulfilled: identifying a target cell associated with the first set of conditions; and performing a random access procedure with the target cell.

The means for evaluating whether the at least one second execution condition has been fulfilled may comprise means for: determining whether the user equipment has traffic to transmit to a network, and/or determining whether the user equipment is expecting to receive traffic from the network.

Said means for configuring the first set of conditions may comprise means for: receiving a first configuration comprising the first set of conditions from a first network node; and implementing the first configuration.

The apparatus may comprise means for: receiving the configuration comprising the first set of conditions in radio resource control reconfiguration signalling.

Said means for configuring the first set of conditions may comprise means for: receiving the at least one first execution condition in different signalling to said at least one second execution condition; and implementing the at least one first execution condition and said at least one second execution condition.

Said at least one second execution condition may be received via at least one a system information broadcast or via non-access stratum signalling.

The at least one first execution condition may comprise an entry condition and a leaving condition, and wherein the at least one first execution condition may be fulfilled when, subsequent to the entry condition being fulfilled, the leaving condition has not been fulfilled.

The entry condition may comprise a duration of time for which the quality of the radio network environment measured by the user equipment should exceed a predetermined threshold amount in order for the at least one first condition to be fulfilled.

According to a fourth aspect, there is provided an apparatus for a first network node, the apparatus comprising means for: preparing a first set of conditions for a user equipment to autonomously implement during a Conditional PSCell addition, CPA, and/or a Conditional PSCell change, CPC, wherein the first set of conditions comprises at least one first execution condition associated with a quality of a radio network environment to be experienced by the user equipment, and at least one second execution condition associated with a momentary traffic that the user equipment has to transmit and/or receive; and signalling the first set of conditions to the user equipment.

The means for preparing may comprise means for: signalling, to a second network node, a request comprising an indication of a plurality of cells that may be prepared for the user equipment in advance of the primary secondary cell change operation; receiving, from the second network node, respective indications of at least one cell of said plurality of cells, each of said selected cells having a respective associated at least one first execution condition; and forming the first set using the selected cells and their respective associated at least one first execution condition.

The means for signalling the first set of conditions may comprise means for signalling the at least one first execution condition to the user equipment while using different signalling for signalling said at least one second execution condition.

The means for signalling the first set of conditions may comprise means for signalling both the at least one first execution condition to the user equipment and said at least one second execution condition to the user equipment.

The apparatus may comprise means for signalling the configuration comprising the first set of conditions in radio resource control reconfiguration signalling.

The at least one first execution condition may comprise an entry condition and a leaving condition, and wherein the at least one first execution condition may be fulfilled when, subsequent to the entry condition being fulfilled, the leaving condition has not been fulfilled.

The entry condition may comprise a duration of time for which the quality of the radio network environment measured by the user equipment should exceed a predetermined threshold amount in order for the at least one first condition to be fulfilled.

According to a fifth aspect, there is provided an apparatus for a user equipment, the apparatus comprising: at least one processor; and at least one memory comprising code that, when executed by the at least one processor, causes the apparatus to perform: configuring, at the user equipment, a first set of conditions for autonomously executing a secondary link establishment during a Conditional PSCell addition, CPA, and/or a Conditional PSCell change, CPC, wherein the first set of conditions comprises at least one first execution condition associated with a quality of a radio network environment to be experienced by the user equipment, and at least one second execution condition associated with a momentary traffic that the user equipment has to transmit and/or receive; evaluating whether the at least one first execution condition has been fulfilled; evaluating whether the at least one second execution condition has been fulfilled; and abstaining from executing the secondary link establishment until the at least one second execution condition is fulfilled simultaneously with the at least one first execution condition.

The apparatus may be caused to perform: in response to evaluating that the at least one second execution condition is fulfilled when the at least one first execution condition is fulfilled: identifying a target cell associated with the first set of conditions; and performing a random access procedure with the target cell.

The evaluating whether the at least one second execution condition has been fulfilled may comprise: determining whether the user equipment has traffic to transmit to a network, and/or determining whether the user equipment is expecting to receive traffic from the network.

Said configuring the first set of conditions may comprise: receiving a first configuration comprising the first set of conditions from a first network node; and implementing the first configuration.

The apparatus may be caused to perform: receiving the configuration comprising the first set of conditions in radio resource control reconfiguration signalling.

Said configuring the first set of conditions may comprise: receiving the at least one first execution condition in different signalling to said at least one second execution condition; and implementing the at least one first execution condition and said at least one second execution condition.

Said at least one second execution condition may be received via at least one a system information broadcast or via non-access stratum signalling.

The at least one first execution condition may comprise an entry condition and a leaving condition, and wherein the at least one first execution condition may be fulfilled when, subsequent to the entry condition being fulfilled, the leaving condition has not been fulfilled.

The entry condition may comprise a duration of time for which the quality of the radio network environment measured by the user equipment should exceed a predetermined threshold amount in order for the at least one first condition to be fulfilled.

According to a sixth aspect, there is provided an apparatus for a first network node, the apparatus comprising: at least one processor; and at least one memory comprising code that, when executed by the at least one processor, causes the apparatus to perform: preparing a first set of conditions for causing a user equipment to autonomously implement during a Conditional PSCell addition, CPA, and/or a Conditional PSCell change, CPC, wherein the first set of conditions comprises at least one first execution condition associated with a quality of a radio network environment to be experienced by the user equipment, and at least one second execution condition associated with a momentary traffic that the user equipment has to transmit and/or receive; and signalling the first set of conditions to the user equipment.

The preparing may comprise: signalling, to a second network node, a request comprising an indication of a plurality of cells that may be prepared for the user equipment in advance of the primary secondary cell change operation; receiving, from the second network node, respective indications of at least one cell of said plurality of cells, each of said selected cells having a respective associated at least one first execution condition; and forming the first set using the selected cells and their respective associated at least one first execution condition.

Said signalling the first set of conditions may comprise signalling the at least one first execution condition to the user equipment while using different signalling for signalling said at least one second execution condition.

Said signalling the first set of conditions may comprise signalling both the at least one first execution condition to the user equipment and said at least one second execution condition to the user equipment.

The apparatus may be caused to perform signalling the configuration comprising the first set of conditions in radio resource control reconfiguration signalling.

The at least one first execution condition may comprise an entry condition and a leaving condition, and wherein the at least one first execution condition may be fulfilled when, subsequent to the entry condition being fulfilled, the leaving condition has not been fulfilled.

The entry condition may comprise a duration of time for which the quality of the radio network environment measured by the user equipment should exceed a predetermined threshold amount in order for the at least one first condition to be fulfilled.

According to a seventh aspect, there is provided an apparatus for a user equipment, the apparatus comprising: configuring circuitry for configuring, at the user equipment, a first set of conditions for autonomously executing a secondary link establishment during a Conditional PSCell addition, CPA, and/or a Conditional PSCell change, CPC, wherein the first set of conditions comprises at least one first execution condition associated with a quality of a radio network environment to be experienced by the user equipment, and at least one second execution condition associated with a momentary traffic that the user equipment has to transmit and/or receive; evaluating circuitry for evaluating whether the at least one first execution condition has been fulfilled; evaluating circuitry for evaluating whether the at least one second execution condition has been fulfilled; and abstaining circuitry for abstaining from executing the secondary link establishment until the at least one second execution condition is fulfilled simultaneously with the at least one first execution condition.

The apparatus may comprise: in response to evaluating that the at least one second execution condition is fulfilled when the at least one first execution condition is fulfilled: identifying circuitry for identifying a target cell associated with the first set of conditions; and performing circuitry for performing a random access procedure with the target cell.

The evaluating circuitry for evaluating whether the at least one second execution condition has been fulfilled may comprise: determining circuitry for determining whether the user equipment has traffic to transmit to a network, and/or determining circuitry for determining whether the user equipment is expecting to receive traffic from the network.

Said configuring circuitry for configuring the first set of conditions may comprise: receiving circuitry for receiving a first configuration comprising the first set of conditions from a first network node; and implementing circuitry for implementing the first configuration.

The apparatus may comprise: receiving circuitry for receiving the configuration comprising the first set of conditions in radio resource control reconfiguration signalling.

Said configuring circuitry for configuring the first set of conditions may comprise: receiving circuitry for receiving the at least one first execution condition in different signalling to said at least one second execution condition; and implementing g circuitry for implementing the at least one first execution condition and said at least one second execution condition.

Said at least one second execution condition may be received via at least one a system information broadcast or via non-access stratum signalling.

The at least one first execution condition may comprise an entry condition and a leaving condition, and wherein the at least one first execution condition may be fulfilled when, subsequent to the entry condition being fulfilled, the leaving condition has not been fulfilled.

The entry condition may comprise a duration of time for which the quality of the radio network environment measured by the user equipment should exceed a predetermined threshold amount in order for the at least one first condition to be fulfilled.

According to an eighth aspect, there is provided an apparatus for a first network node, the apparatus comprising: preparing circuitry for preparing a first set of conditions for a user equipment to autonomously implement during a Conditional PSCell addition, CPA, and/or a Conditional PSCell change, CPC, wherein the first set of conditions comprises at least one first execution condition associated with a quality of a radio network environment to be experienced by the user equipment, and at least one second execution condition associated with a momentary traffic that the user equipment has to transmit and/or receive; and signalling circuitry for signalling the first set of conditions to the user equipment.

The preparing circuitry for preparing may comprise: signalling circuitry for signalling, to a second network node, a request comprising an indication of a plurality of cells that may be prepared for the user equipment in advance of the primary secondary cell change operation; receiving circuitry for receiving, from the second network node, respective indications of at least one cell of said plurality of cells, each of said selected cells having a respective associated at least one first execution condition; and forming circuitry for forming the first set using the selected cells and their respective associated at least one first execution condition.

The signalling circuitry for signalling the first set of conditions may comprise signalling the at least one first execution condition to the user equipment while using different signalling for signalling said at least one second execution condition.

The signalling circuitry for signalling the first set of conditions may comprise signalling both the at least one first execution condition to the user equipment and said at least one second execution condition to the user equipment.

The apparatus may comprise signalling circuitry for signalling the configuration comprising the first set of conditions in radio resource control reconfiguration signalling.

The at least one first execution condition may comprise an entry condition and a leaving condition, and wherein the at least one first execution condition may be fulfilled when, subsequent to the entry condition being fulfilled, the leaving condition has not been fulfilled.

The entry condition may comprise a duration of time for which the quality of the radio network environment measured by the user equipment should exceed a predetermined threshold amount in order for the at least one first condition to be fulfilled.

According to a ninth aspect, there is provided non-transitory computer readable medium comprising program instructions for causing an apparatus for a user equipment to perform: configuring, at the user equipment, a first set of conditions for autonomously executing a secondary link establishment during a Conditional PSCell addition, CPA, and/or a Conditional PSCell change, CPC, wherein the first set of conditions comprises at least one first execution condition associated with a quality of a radio network environment to be experienced by the user equipment, and at least one second execution condition associated with a momentary traffic that the user equipment has to transmit and/or receive; evaluating whether the at least one first execution condition has been fulfilled; evaluating whether the at least one second execution condition has been fulfilled; and abstaining from executing the secondary link establishment until the at least one second execution condition is fulfilled simultaneously with the at least one first execution condition.

The apparatus may be caused to perform: in response to evaluating that the at least one second execution condition is fulfilled when the at least one first execution condition is fulfilled: identifying a target cell associated with the first set of conditions; and performing a random access procedure with the target cell.

The evaluating whether the at least one second execution condition has been fulfilled may comprise: determining whether the user equipment has traffic to transmit to a network, and/or determining whether the user equipment is expecting to receive traffic from the network.

Said configuring the first set of conditions may comprise: receiving a first configuration comprising the first set of conditions from a first network node; and implementing the first configuration.

The apparatus may be caused to perform: receiving the configuration comprising the first set of conditions in radio resource control reconfiguration signalling.

Said configuring the first set of conditions may comprise: receiving the at least one first execution condition in different signalling to said at least one second execution condition; and implementing the at least one first execution condition and said at least one second execution condition.

Said at least one second execution condition may be received via at least one a system information broadcast or via non-access stratum signalling.

The at least one first execution condition may comprise an entry condition and a leaving condition, and wherein the at least one first execution condition may be fulfilled when, subsequent to the entry condition being fulfilled, the leaving condition has not been fulfilled.

The entry condition may comprise a duration of time for which the quality of the radio network environment measured by the user equipment should exceed a predetermined threshold amount in order for the at least one first condition to be fulfilled.

According to a tenth aspect, there is provided non-transitory computer readable medium comprising program instructions for causing an apparatus for a first network node to perform: preparing a first set of conditions for a user equipment to autonomously implement during a Conditional PSCell addition, CPA, and/or a Conditional PSCell change, CPC, wherein the first set of conditions comprises at least one first execution condition associated with a quality of a radio network environment to be experienced by the user equipment, and at least one second execution condition associated with a momentary traffic that the user equipment has to transmit and/or receive; and signalling the first set of conditions to the user equipment.

The preparing may comprise: signalling, to a second network node, a request comprising an indication of a plurality of cells that may be prepared for the user equipment in advance of the primary secondary cell change operation; receiving, from the second network node, respective indications of at least one cell of said plurality of cells, each of said selected cells having a respective associated at least one first execution condition; and forming the first set using the selected cells and their respective associated at least one first execution condition.

Said signalling the first set of conditions may comprise signalling the at least one first execution condition to the user equipment while using different signalling for signalling said at least one second execution condition.

Said signalling the first set of conditions may comprise signalling both the at least one first execution condition to the user equipment and said at least one second execution condition to the user equipment.

The apparatus may be caused to perform signalling the configuration comprising the first set of conditions in radio resource control reconfiguration signalling.

The at least one first execution condition may comprise an entry condition and a leaving condition, and wherein the at least one first execution condition may be fulfilled when, subsequent to the entry condition being fulfilled, the leaving condition has not been fulfilled.

The entry condition may comprise a duration of time for which the quality of the radio network environment measured by the user equipment should exceed a predetermined threshold amount in order for the at least one first condition to be fulfilled.

According to an eleventh aspect, there is provided a computer program product stored on a medium that may cause an apparatus to perform any method as described herein.

According to a twelfth aspect, there is provided an electronic device that may comprise apparatus as described herein.

According to a thirteenth aspect, there is provided a chipset that may comprise an apparatus as described herein.

BRIEF DESCRIPTION OF FIGURES

Some examples, will now be described, merely by way of illustration only, with reference to the accompanying drawings in which:

FIGS. 1A and 1B show a schematic representation of a 5G system;

DETAILED DESCRIPTION

For brevity and clarity, the following describes operations that may be performed as part of a conditional cell change operations involving Primary Secondary Cells (PSCells), such as, for example, conditional PSCell addition (CPA) and Conditional PSCell change (CPC).

The following will outline features of PSCells in relation to 5G New Radio, using terminology used therein. However, it is understood that the presently described principles are not limited to such terminology, and may be applied to other systems having a similar architecture. For example, in multi-radio-dual connectivity (MR-DC), a Primary Cell (PCell) may be a Long Term Evolution (LTE) cell (e.g., Evolved-Universal Terrestrial Radio Access-New Radio-dual connectivity (EN-DC)).

PSCells are a type of cell currently defined in 5G New Radio, along with Primary Cells (PCells), Secondary Cells (SCells) and Special Cells (SpCells). A PCell may be used as part of an initial access between a UE and an access network, and is considered to be a main cell in a master cell group (MCG). A PSCell may be comprised as part of a secondary cell group (SCG). The SpCells and SCells may be in at least one of the MCG and the SCG.

The cells may be controlled by network nodes. There are two different types of network nodes in 5G New Radio: Master nodes (which provide a control plane connection to a core network); and Secondary Nodes (which do not have control plane connections to the core network). The Master and Secondary nodes may both provide user plane (e.g. data) connections to the core network. The Master node may control the PCell. In addition to the PCell, the Master node may control at least one PSCell, although this is not always the case. The Secondary node may control at least one PSCell.

There may further comprise an interface between the different nodes, depending on the dual connectivity option. An X2 interface is an interface between eNBs in LTE that may be reused between Radio Access Network (RAN) nodes in non-standalone operation (e.g., between an eNB and an en-gNB). The Xn interface is an interface between RAN nodes in operating in a standalone operation (e.g., between an ng-eNB and an ng-eNB/gNB and between a gNB/ng-eNB and an gNB) or between nodes operating in at least an NG-EN-DC non-standalone mode or operating in an NE-DC standalone mode.

CPA and CPC were standardized in 3GPP Rel-16 and Rel-17 following a similar approach of Conditional HandOver (CHO) that was standardized in 3GPP Rel-16. It is understood that concepts described above and in the following in relation to 5G networks may find applicability in other networks having analogous functional entities, and/or in future GPP communication networks, such as 6G.

Before describing in detail the examples, certain general principles of a 5G wireless communication system are briefly explained with reference to FIGS. 1A and 1B.

Figure 1A:
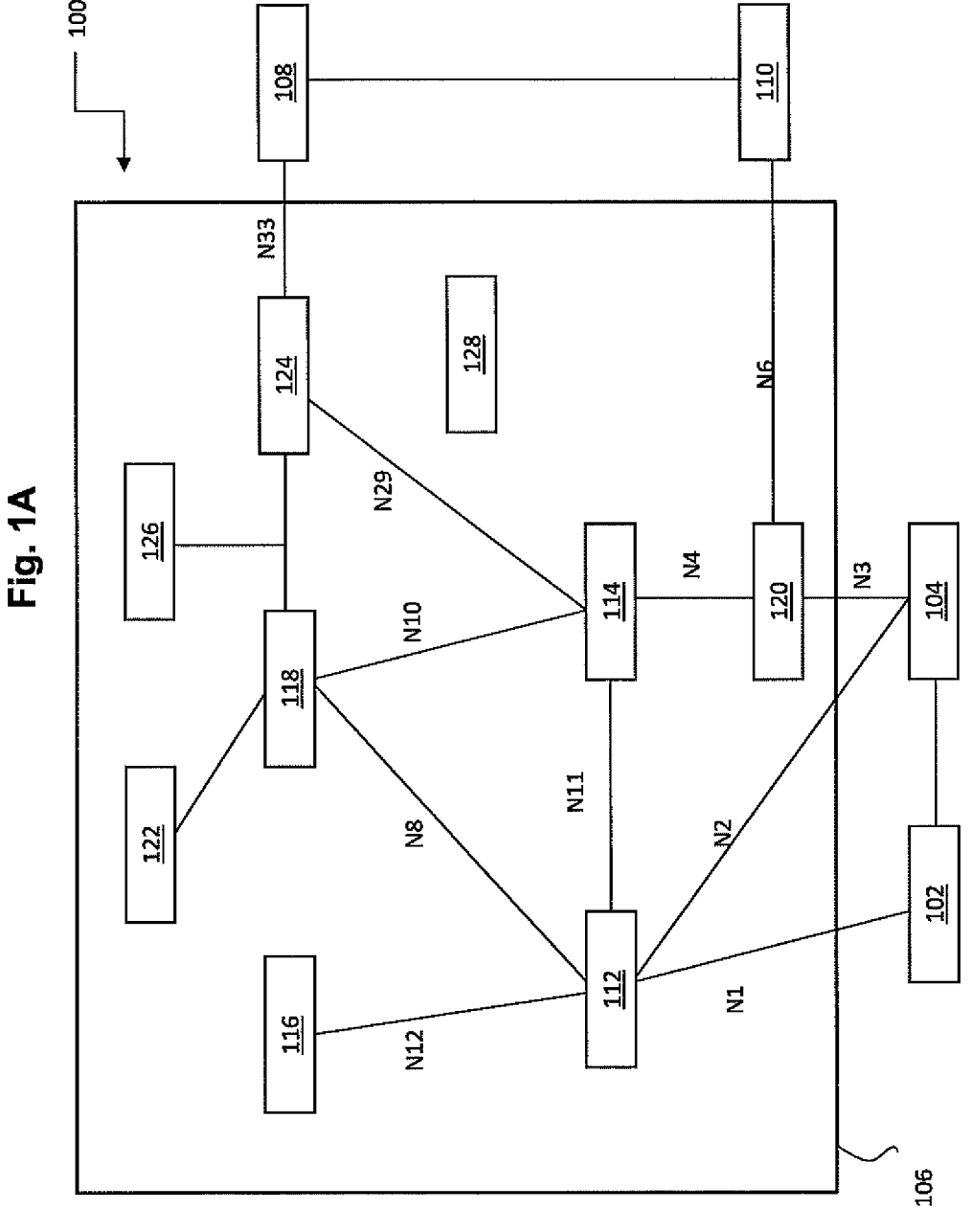

FIG. 1A shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access and Mobility Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. The role of an NEF is to provide secure exposure of network services (e.g. voice, data connectivity, charging, subscriber data, and so forth) towards a 3rd party. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The network may further comprise a management data analytics service (MDAS) producer or MDAS Management Service (MnS) producer. The MDAS MnS producer may provide data analytics in the management plane considering parameters including, for example, load level and/or resource utilization. For example, the MDAS MnS producer fora network function (NF) may collect the NF's load-related performance data, e.g., resource usage status of the NF. The analysis of the collected data may provide forecast of resource usage information in a predefined future time window. This analysis may also recommend appropriate actions e.g., scaling of resources, admission control, load balancing of traffic, and so forth.

Figure 1B:
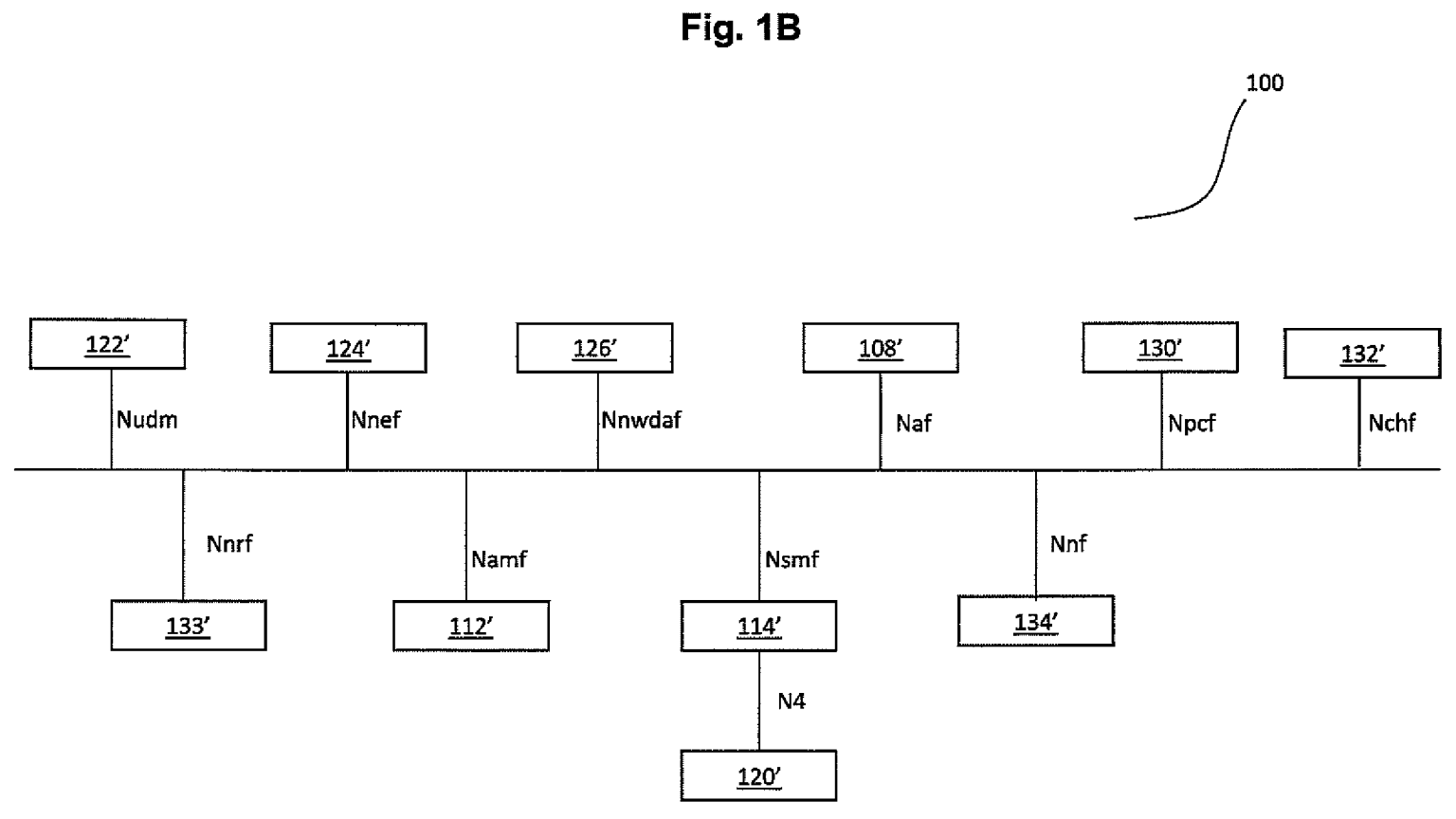

FIG. 1B shows a schematic representation of a 5GC represented in current 3GPP specifications. It is understood that this architecture is intended to illustrate potential components that may be comprised in a core network, and the presently described principles are not limited to core networks comprising only the described components.

FIG. 1B shows a 5GC 106' comprising a UPF 120' connected to an SMF 114' over an N4 interface. The SMF 114' is connected to each of a UDM 122', an NEF 124', an NWDAF 126', an AF 108', a Policy Control Function (PCF) 130', an AMF 112', and a Charging function 132' over an interconnect medium that also connects these network functions to each other. The 5G core 106' further comprises a network repository function (NRF) 133' and a network function 134' that connect to the interconnect medium.

3GPP has issued a number of releases (Rel) for defining operating communication protocols related to a communications network. Currently, objectives and work are being set in relation to Release 18 (Rel. 18).

As mentioned above, Conditional PSCell addition (CPA) and Conditional PSCell change (CPC) were standardized in 3GPP Rel-16 and Rel-17 following a similar approach of Conditional HandOver (CHO) that was standardized in 3GPP Rel-16.

The basic functionality of PSCell addition and PSCell change is to enable a UE to respectively establish or change a secondary radio link to a cell of a secondary cell group (SCG) for dual connectivity purposes. The details on these procedures may be read from TS 37.340 and TS 38.331 for both Rel-16 and Rel-17.

In particular, Rel. 16 specified mechanisms for performing CPC for intra-SN scenario in TS 37.340. CPC of Rel. 16 was then extended in Rel. 17 to also cover inter-SN scenarios where it has two flavours: MN-initiated CPC and SN-initiated CPC. Both of these flavours comprise a common procedure in which an MN establishes an interface with a target SN (e.g., an X2 or XN interface). At the beginning of this common procedure, the MN initiates the SN Addition Preparation procedure towards the target SN.

Figure 6:
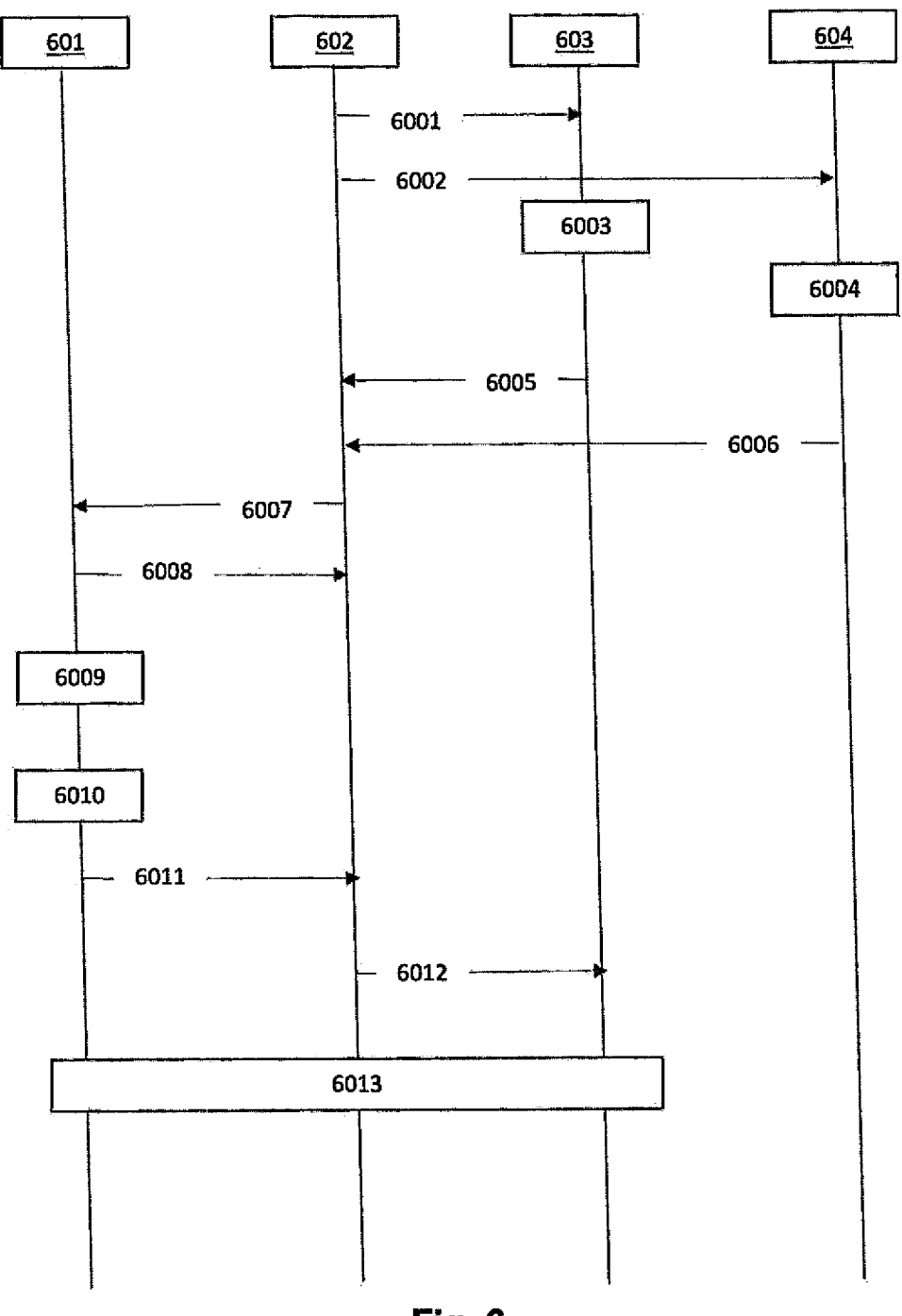
FIG. 6 illustrates signalling between apparatus.

This common procedure is illustrated with respect to FIG. 6. In this example of FIG. 6, a CPA operation is described where no SN serving the UE currently exists yet. It is understood that although the following is framed in terms of CPA, that the preparation of candidate PSCells via SgNB Addition Request signalled by a MN for CPA is the same for CPA operations as it is for CPC operations. For CPC operations, it is understood that a SN may additionally signal an indication that an SN change is to be performed (e.g., using an "SN Change Required" service operation in case of SN-initiated approaches).

FIG. 6 illustrates signalling that may be performed between a UE 601, an MN 602, a first target SN 603, and a second target SN 604.

During 6001, the MN 602 signals the first target SN 603. This signalling may comprise an addition request for adding a new SN. For example, this signalling may comprise an SgNB Addition Request. This signalling may comprise a list of potential PSCell(s) that may be prepared by the first target SN 603, wherein a PSCell is considered to be prepared by a target SN. The list of potential PSCell(s) within the SgNB Addition Request message may be indicated by providing a measurement report (previously received at the MN from the UE) that comprises measurements made of those PSCell(s).

The signalling of 6001 may comprise an explicit indication of a maximum number of PSCells that can be prepared by the first target SN 603 from the signalled list. The ultimate value of said maximum number may be set by a specification (e.g., 8 PSCells).

During 6002, the MN 602 signals the second target SN 604. This signalling may comprise an addition request for adding a new SN. For example, this signalling may comprise an SgNB Addition Request. This signalling may comprise a list of PSCell(s) to be prepared by the second target SN 604, and may comprise the same list as the signalling of 6001. The list of potential PSCell(s) may be indicated by providing a measurement report (provided via a UE) comprising measurements made of those PSCell(s). The signalling of 6002 may comprise an explicit indication of a maximum number of PSCells that can be prepared by the second target SN 604 from the signalled list. The ultimate value of said maximum number may be set by a specification (e.g., 8 PSCells).

During 6003, the first target SN 603 selects a number of candidate target PSCells to be prepared by the first target SN 603 from the list signalled during 6001. The first target SN 603 cannot select a candidate target PSCell to prepare that isn't comprised in the list signalled during 6001. The number selected may not exceed the signalled maximum number.

During 6004, the second target SN 604 selects a number of candidate target PSCells to be prepared by the second target SN 604 from the list signalled during 6002. The second target SN 604 cannot select a candidate target PSCell to prepare that isn't comprised in the list signalled during 6002. The number selected may not exceed the signalled maximum number.

During 6005, the first target SN 603 signals the MN 602. This signalling of 6005 may comprise an acknowledgement of the signalling of 6001. For example, the signalling of 6005 may comprise an SgNB Addition Request Acknowledgement. The signalling of 6005 may comprise SCG configurations of the prepared target PSCells of 6003.

In some examples, the first target SN may comprise respective information to be used for the each SCG configuration. In some examples, this information may comprise a respective execution condition for each candidate target PSCell and/or may indicate the radio bearers that each candidate target PSCell supports.

During 6006, the second target SN 604 signals the MN 602. This signalling of 6006 may comprise an acknowledgement of the signalling of 6001. For example, the signalling of 6006 may comprise an SgNB Addition Request Acknowledgement. The signalling of 6006 may comprise SCG configurations of the prepared target PSCells of 6004.

In some examples, the second target SN may comprise respective information to be used for the each SCG configuration. In some examples, this information may comprise a respective execution condition for each candidate target PSCell and/or may indicate the radio bearers that each candidate target PSCell supports.

During 6007, the MN 602 signals the UE 601. This signalling of 6007 may comprise at least one reconfiguration for the UE 601 to perform when an associated set of conditions are fulfilled. In other words, the signalling of 6007 may comprise a conditional reconfiguration. The signalled reconfigurations may comprise radio resource control (RRC) reconfigurations. The signalling of 6007 may comprise CPA configurations for the candidate PSCells signalled during 6005 and/or 6006, along with their respective associated execution conditions.

During 6008, the UE 601 signals an acknowledgment message to the MN 602 in respect of the signalling of 6007.

During 6009, the UE 601 evaluates the SCG execution conditions received during 6007 in respect of the candidate target PSCells. For clarity and brevity, the following will consider SCG execution conditions as CPA execution conditions. However, it is understood that the same mechanism may be applied with respect to the SCG execution conditions comprising CPC execution conditions.

During 6010, the UE 601 determines that a set of CPA execution conditions associated with a particular PSCell have been fulfilled. In response to this determination of 6010, the UE 601 identifies the CPA configuration received during 6007 that is associated with the fulfilled set of CPA execution conditions, and executes the identified associated CPA configuration. The CPA configuration may comprise an updated MCG configuration and a target SCG configuration.

During 6011, the UE 601 signals the MN 602 to indicate that the identified associated CPA configuration has been executed. This signalling may comprise an RRC reconfiguration complete service operation. This signalling may identify the identified associated CPA configuration.

Assuming that, in the present example, the identified associated CPA configuration is associated with the first target SN 603, during 6012 the MN 602 signals the first target SN node 603 to indicate that the UE 601 has executed the associated CPA configuration.

During 6013, the UE 601 performs random access to the first target SN 603 (if needed).

In legacy Rel. 15 PSCell addition and change procedure (defined in TS 37.340), the network triggers PSCell addition and change of SN based on a measurement report that is sent by the UE. Having received the measurement report, the network triggers the preparation of the target SN in a similar manner to 6001 and 6002. In this legacy case, the UE needs to wait after sending the measurement report to receive the command from the network to add or change a PSCell. This delay will have an impact on the UE throughput because, in case of SN addition, the UE cannot immediately leverage a higher capacity/throughput by adding a second radio link to a PSCell served by an SN or, and because, in case of SN change, the secondary link of the UE will be served for a longer time by a PSCell and its serving SN having a lower radio quality.

Therefore, one main benefit of CPAC introduced in Rel. 16 is that the UE can perform access to target SN immediately without delay when the condition is met. This means that delays arising from the following elements of the Rel. 15 model may be avoided: the delay associated with 1) the UE sending a Measurement Report to the network 2) the network to preparing at least one target SN using SN addition request and response (e.g., such as 6001 and 6002), and 3) reconfiguring the UE (e.g., sending an RRC Reconfiguration to the UE and the UE executing the reconfiguration). These delay savings introduced via a conditional procedure of Rel. 16 and/or Rel. 17 may enable the UE to leverage the radio resource of SN immediately in case of CPA and to more quickly use an SN with better radio link quality in case of CPC.

The CPA execution conditions are given respective labels in TS 38.331 and TS 36.331. In particular, the CPA execution condition can be for instance an A4 event (when the MN and SN utilize the same Radio Access Technology (RAT)) or a B1 event (when the MN and SN have different RAT), as defined in TS 38.331 and TS 36.331, respectively.

In TS 38.331, Condition Event A4 (CondeventA4) is mentioned in relations to the report configuration Information Element (IE) (ReportConfigNR IE). The IE ReportConfigNR specifies criteria for triggering of an NR measurement reporting event or of a Conditional Handover (CHO), CPA or CPC event or of a Layer 2 (L2) UE-to-Network (U2N) relay measurement reporting event. For events labelled AN with N equal to 1, 2 and so on, measurement reporting events and CHO, CPA or CPC events are based on cell measurement results, which can either be derived based on Synchronization signal (SS)/Physical Broadcast Channel (PBCH) block reference signals (SSB-RS) or Channel Status Information-reference signal (CSI-RS). CondEvent A4 is defined as a Conditional reconfiguration that is performed when a candidate becomes better than a predetermined absolute threshold.

In TS 36.331, Condition Event B1 (CondEvent B1) is mentioned in relation to a report configuration information element for inter-radio access technology. For example, the ReportConfigInterRAT specifies criteria for triggering of an inter-RAT measurement reporting event or of a CPA or MN initiated inter-SN CPC event. The inter-RAT measurement reporting events for NR, UTRAN, GSM EDGE Radio Access Network (GERAN) and Code Division Multiple Access 2000 (CDMA2000) are labelled BN with N equal to 1, 2 and so on. The inter-RAT measurement reporting events for WLAN are labelled WN with N equal to 1, 2 and so on. CondEvent B1 is defined as a Conditional reconfiguration that is performed when a candidate becomes better than a predetermined absolute threshold.

For each of these Condition events, there is an entering and leaving requirement. For instance, the entering condition for condEvent A4, which is the same as that of A4 event, is defined as $$Mn-Hys>Thresh$$

where Mn is the measurement of the candidate cell, Hys is the hysteresis parameter and Thresh is the threshold parameter for this event.

The Leaving requirement for CondEvent A4 is defined as:

$$Mn+Hys<Thresh.$$

For both of the Condition events, the UE executes CPA configuration when the entering condition is satisfied for a predetermined time period, referred to herein as a Time-to-Trigger (TTT) duration.

The present disclosure recognizes that the execution of a CPA configuration based on the evaluation of radio measurements only can lead to sub-optimal performance with respect to energy consumption in case of user data inactivity at the time the CPA execution condition is met.

Figure 7A:
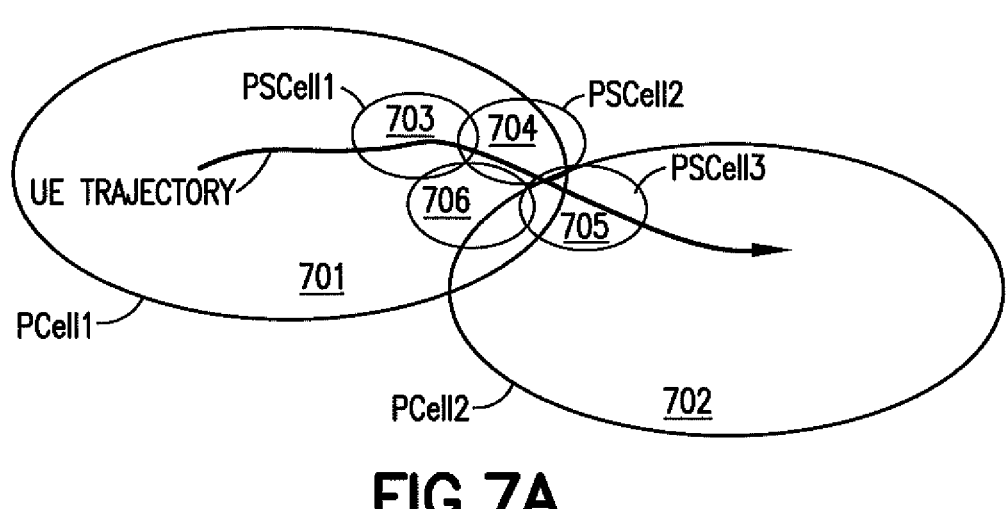
FIGS. 7A to 7C illustrates an example scenario.
Figure 7B:
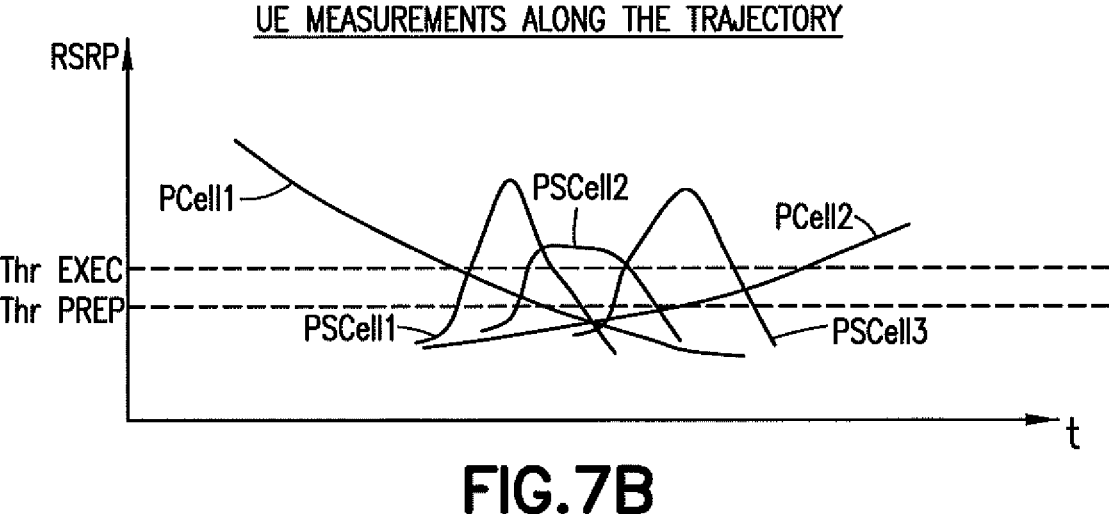
Figure 7C:
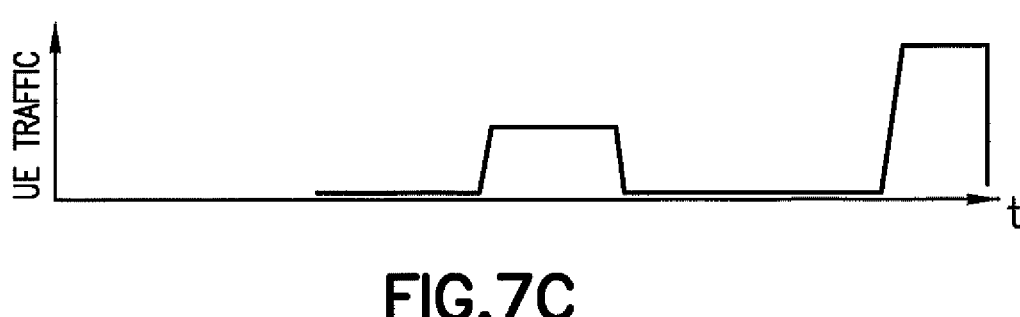

This is illustrated with respect to FIGS. 7A to 7C.

FIG. 7A illustrates a first MN (MN 1) providing a first PCell coverage area 701 adjacent to a second Pcell coverage area 702 provided by a second MN (MN 2). There are also provided respective coverage areas 703 to 706 provided by first to fourth PSCells that are each located within at least one of the first and second PCell coverage areas 701,702. There is further shown an arrow depicting a trajectory of a UE (not shown) though at least some of the different coverage areas.

FIG. 7B illustrates example Reference Signal Received Power (RSRP) measurements performed by the UE along the trajectory.

In this example, the UE moves from the coverage area of the first PCell 1 (controlled by MN 1) to another coverage area provided by a second PCell (controlled by MN 2), during which the UE crosses coverage of multiple PSCells, namely the first PSCell, the second PSCell, and the third PSCell.

In this example, MN 1 prepares PSCell 1 once the RSRP of the first PSCell exceeds the threshold Thr_prep, which could be for instance another A4 event, and configures the UE with CPA execution configuration. The UE then executes CPA to the first PSCell once the RSRP of the first PSCell exceeds another threshold Thr_exec, which could be for instance CondeventA4. Herein, the UE executes establishment of the secondary link by performing the random access to PSCell 1. That secondary link establishment is triggered although the UE does not have a pending user plane traffic to send data in uplink or receive data in downlink (as shown in the Traffic graphic illustrated by FIG. 7C). Later on, MN prepares PSCell 2 for CPC and the UE executes CPC to the second PSCell coverage area 704 from the first PSCell coverage area 703. Afterwards, the UE receives some pending data to send/receive to/from the network while being connected to the second PSCell.

According to this example, the CPA execution to PSCell 1 is deemed to be unnecessary as the UE did not have pending traffic to communicate to the network and accordingly it did not need to establish the second link to the SCG. It would be an unnecessary execution of CPA that increases the power consumption of the UE as well as the signaling overhead over the radio and network interfaces. In other words, the UE could have saved power consumption if it has skipped the CPA execution to target PSCell 1. The preparation procedure will be updated radio measurements, thus CPA execution could be directly performed to target PSCell 2 when it gets some pending traffic to send/or receive to/from the network. This would be beneficial in scenarios when the traffic of the UE is sporadic (infrequent data transmission/reception) and/or when the UE moves at a high speed crossing several small PSCell coverage.

According to TS 37.340, the CPA execution condition may comprise one or more trigger conditions. However, both trigger conditions should relate to the same Reference Signal (RS) and can have two different measurement quantities. In particular, TS 37.340 states that an execution condition may comprise of only one or two trigger condition (s) (CondEvents, as defined in TS 38.331 or TS 36.331). Only a single reference signal type and at most two different trigger quantities (e.g. Reference Signal Received Power (RSRP) and Reference Signal Received Quality (RSRQ), RSRP and Signal to Interference and Noise Ratio (SINR), etc.) can be used for the evaluation of CPA execution condition of a single candidate PSCell.

For example, the network can configure a CPA execution condition that consists of CondEvent A4 using RSRP as measurement quantity and another CondEvent A4 using RSRQ as measurement quantity. The UE would execute the CPA configuration if one of the condition (denoted by condition 1) is met while the other condition 2 has been met before and condition 2's leaving requirement is not met when condition 1's entry requirement is met. Both of these trigger entry requirements are still based on radio measurements (signal strength and/or signal quality) without considering any user plane activity at the UE side when the CPA execution conditions are met.

To address at least one of the presently described issues, the following proposes that the execution of Conditional PSCell Addition (CPA) configuration is triggered by two criteria to be fulfilled.

First, that a signal strength and/or quality of candidate PSCell measurement exceeds a threshold. This first CPA execution condition may be evaluated using radio signal strength and/or quality measurements. This first CPA execution condition is also labelled herein as CPA execution condition 1.

Second, that a UE has pending data traffic to be transmitted to the network and/or to be received from the network. This second CPA execution condition that considers user data activity is labelled as CPA execution condition 2.

The operation of the described UE may therefore vary depending on whether only one of CPA execution condition 1 and CPA execution condition 2 are fulfilled at any particular point in time, or whether both CPA execution condition 1 and CPA execution condition 2 are fulfilled simultaneously.

For example, consider the case when both CPA execution condition 1 and CPA execution condition 2 are simultaneously fulfilled. In this case, the UE executes the CPA configuration associated with the combination of these two conditions. In other words, the UE executes the CPA configuration if the CPA execution condition 1 evaluated using the radio measurements is met and the UE has pending data to receive or transmit from/to network (CPA execution condition 2 is met).

As another example, consider the case when CPA execution condition 1 is fulfilled, but the UE does not have pending data to receive or transmit. In this other example, the UE does not execute the CPA configuration associated with the combination of these two conditions. In other words, when the CPA execution condition 1 is met while the UE does not have pending data to receive or transmit (i.e., while CPA execution condition 2 is not met), the UE does not execute CPA configuration.

In this other example, the UE can execute the CPA configuration later (after the CPA execution condition 1 is met) if UE later determines that the UE has pending data to receive or transmit while the CPA execution condition 1 has been fulfilled.

Related to this, the UE may apply the CPA configuration when the leaving requirement of CPA execution condition 1 is not met while the UE has pending data to receive or transmit.

In both of the above-mentioned examples (and the examples of FIGS. 8 to 10, mentioned below), the UE may be considered as having pending data to receive or transmit (CPA execution condition 2 is met) in at least one of the following cases.

First, the UE may be considered as having pending data when the UE has active user plane communication with MN.

Second, the UE may be considered as having pending data when the UE has any pending uplink data to transmit in uplink.

Third, the UE may be considered as having pending data when the UE has any pending downlink data to be received in downlink.

Fourth, the UE may be considered as having pending data when the amount of pending data to transmit in the buffer exceeds a threshold configured by the network.

Figure 8:
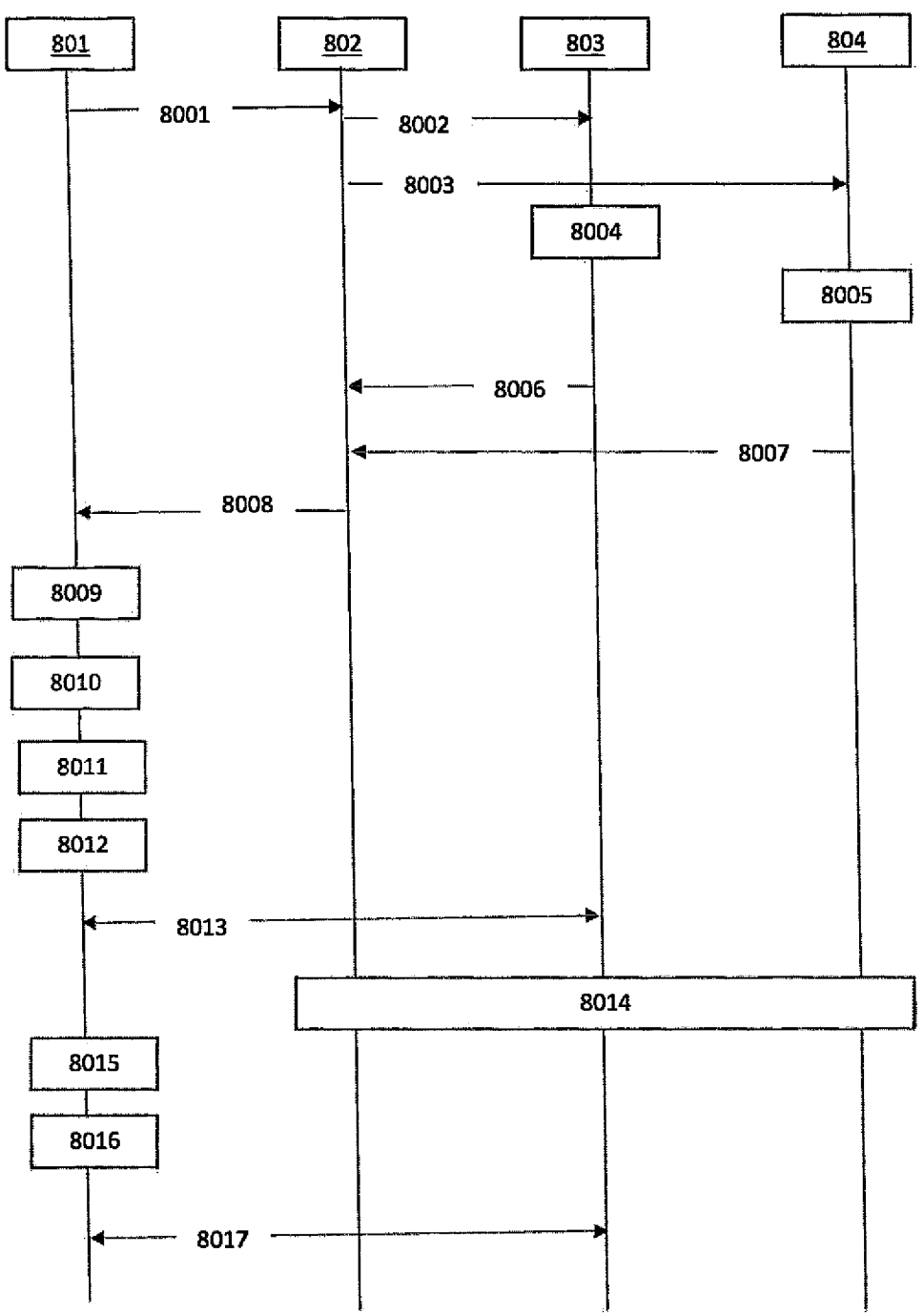
FIG. 8 illustrates example signalling.

These, and other features, are illustrated with respect to FIG. 8.

FIG. 8 illustrates signalling that may be performed between a UE 801, an MN 802, a first target SN 803, and a second target SN 804.

During 8001, the UE 801 signals a measurement report to the MN 802. This measurement report may comprise an indication of values of at least one measurement performed by the UE 801 according to a first measurement configuration. The at least one measurement may reflect a quality of at least one aspect of a current radio environment of the UE 801. For example, the at least one measurement may relate to a quality of a cell currently provided by the MN 802 and/or a quality of a cell currently provided by the first target SN, and/or a quality of a cell currently provided by the second target SN.

During 8002, the MN 802 signals the first target SN 803. This signalling may comprise an addition request for adding a new SN. For example, this signalling may comprise an SgNB Addition Request. This signalling may comprise a list of PSCell(s) to be prepared by the first target SN 803, wherein a PSCell is considered to be prepared by a target SN by that target SN signalling a measurement report to the SN that comprises measurement results for said PSCell. Therefore, even though not shown, the first target SN 803 may signal to the MN 802 a measurement report comprising respective measurement results for at least one (and possibly all) of the PSCell's listed in the signalling of 8002 as a candidate PSCell. The signalling of 8002 may comprise an explicit indication of a maximum number of PSCells that can be prepared by the first target SN 803 from the signalled list. The ultimate value of said maximum number may be set by a specification (e.g., 8 PSCells).

During 8003, the MN 802 signals the second target SN 804. This signalling may comprise an addition request for adding a new SN. For example, this signalling may comprise an SgNB Addition Request. This signalling may comprise a list of PSCell(s) to be prepared by the second target SN 804, and may comprise the same list as the signalling of 8002. Therefore, even though not shown, the second target SN 804 may signal to the MN 802 a measurement report comprising respective measurement results for at least one (and possibly all) of the PSCell's listed in the signalling of 8003 as a candidate PSCell. The signalling of 8003 may comprise an explicit indication of a maximum number of PSCells that can be prepared by the second target SN 804 from the signalled list. The ultimate value of said maximum number may be set by a specification (e.g., 8 PSCells).

During 8004, the first target SN 803 selects a number of candidate target PSCells to be prepared by the first target SN 803 from the list signalled during 8002. The first target PSCell 803 cannot select a candidate target PSCell to prepare that isn't comprised in the list signalled during 8002.

During 8005, the second target SN 804 selects a number of candidate target PSCells to be prepared by the second target SN 804 from the list signalled during 8003. The second target PSCell 804 cannot select a candidate target PSCell to prepare that isn't comprised in the list signalled during 8003.

During 8006, the first target SN 803 signals the MN 802. This signalling of 8006 may comprise an acknowledgement of the signalling of 8002. For example, the signalling of 8006 may comprise an SgNB Addition Request Acknowledgement. The signalling of 8006 may comprise SCG configurations of the prepared target PSCells of 8004.

In some examples, the first target SN may comprise respective information to be used for the each SCG configuration (e.g., for each CPA configuration and/or the CPC configuration). In some examples, this information may comprise a respective execution condition for each candidate target PSCell and/or may indicate the radio bearers that each candidate target PSCell supports.

During 8007, the second target SN 804 signals the MN 802. This signalling of 8007 may comprise an acknowledgement of the signalling of 8002. For example, the signalling of 8007 may comprise an SgNB Addition Request Acknowledgement. The signalling of 8007 may comprise SCG configurations of the prepared target PSCells of 8005.

In some examples, the second target SN may comprise respective information to be used for the each SCG configuration (e.g., for each CPA configuration and/or the CPC configuration). In some examples, this information may comprise a respective execution condition for each candidate target PSCell and/or may indicate the radio bearers that each candidate target PSCell supports.

During 8008, the MN 802 signals the UE 801. This signalling of 8008 may comprise at least one reconfiguration for the UE 801 to perform when an associated set of conditions are fulfilled. In other words, the signalling of 8008 may comprise a conditional reconfiguration. The signalled reconfigurations may comprise radio resource control (RRC) reconfigurations. The signalled of 8008 may comprise SCG configurations for the candidate PSCells signalled during 8006 and/or 8007, along with their respective associated execution conditions. For clarity and brevity, the following will be discussed in terms of the SCG comprising CPA execution conditions. However, it is understood that the presently described techniques may also be applied when the SCG comprises CPC execution conditions as well, or instead of, the CPA execution conditions.

The signalling of 8008 may comprise, for each SCG configuration signalled, respective CPA execution conditions 1 and 2 (i.e., respective CPA execution conditions for a CPA execution condition 1, based on radio measurements, and a CPA execution condition 2, based on pending data to be transmitted and/or received by the UE 801). A UE may be configured to autonomously apply condition 2 after determining/evaluating that CPA execution condition 1 has been performed.

The UE may be configured to autonomously apply CPA execution condition 2 in a plurality of different ways. For example, although the present example illustrates an architecture in which a master node instructs the UE to evaluate CPA execution condition 2 when signalling CPA execution condition 1 during 8008, the UE may be instructed to evaluate CPA execution condition 2 at another time.

For instance, the UE may be instructed to evaluate CPA execution condition via a System Information Broadcast received from a network access node (e.g., from the master node). This signalling may be performed when the UE initially connects to the network. As another example, the user equipment may be provided with an instruction to evaluate CPA execution condition 2 via non-access stratum signalling. As another example, the UE may be preconfigured to always evaluate CPA execution 2 in the absence of any signalling from the network to the contrary.

Although not shown, the UE 801 may respond to this signalling of 8008 with an acknowledgement.

During 8009, the UE 801 evaluates whether the entry requirement(s) for CPA execution condition 1 is met.

During 8010, it is determined that the entry requirement(s) for CPA execution condition 1 is met. When the entry requirement(s) for CPA execution condition 1 is met (and/or is met for at least a predetermined length of time), the UE 801 proceeds to 801.

During 8011, the UE 801 determines whether the entry requirement(s) for CPA execution condition 2 is met simultaneously with the entry requirement(s) of CPA execution condition 1. When the entry requirement(s) of CPA execution condition 2 is determined as being met simultaneously with the entry requirement(s) of CPA execution condition 1, the UE 802 proceeds to 8012. When the entry requirement(s) of CPA execution condition 2 is determined as not being met simultaneously with the entry requirement(s) of CPA execution condition 1, the UE 802 proceeds to 8015.

During 8012, the UE executed the CPA associated with the combination of CPA execution condition 1 and CPA execution condition 2, and proceeds to 8013.

During 8013, the UE 801 performs random access with the PSCell associated with the combination of fulfilled entry requirements of CPA execution condition 1 and CPA execution condition 2. In this case, the PSCell is provided by the first target SN 803. Therefore, during 8013, the UE performs random access with the first target SN 803. Following 8013, the UE 801 proceeds to 8014.

During 8014, the MN 802, the first target SN 803, and the second target SN 804 released any candidate cells prepared for the UE 801 that the UE 801 did not access during 8013.

During 8015, the UE continues to monitor both the entry requirement(s) for CPA execution condition 2 and the leaving requirement(s) for CPA execution condition 1.

When, during 8015, the UE determines that the leaving requirement(s) for CPA execution condition 1 is met before the entry requirement(s) for CPA execution condition 2 is met, the UE returns to 8009.

When, during 8015, the UE determines that the leaving requirement(s) for CPA execution condition 1 is not met before the entry requirement(s) for CPA execution condition 2 is met, the UE proceeds to 8016.

During 8016, the UE executed the CPA associated with the combination of CPA execution condition 1 and CPA execution condition 2.

Figure 9:
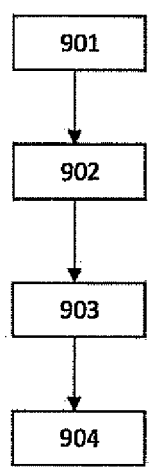
FIGS. 9 and 10 illustrate example operations that may be performed by apparatus described herein.
Figure 10:
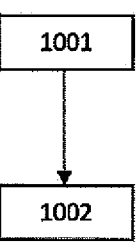

FIGS. 9 and 10 illustrate aspects of the above examples. It is therefore understood that features described above may find correspondence in the below-mentioned features, and/or be used to provide examples of how these following features may be implemented.

FIG. 9 illustrates operations that may be performed by a user equipment.

During 901, the user equipment may be configured with a first set of conditions for autonomously executing a secondary link establishment during a Conditional PSCell addition, CPA, and/or a Conditional PSCell change, CPC. The first set of conditions comprises at least one first execution condition associated with a quality of a radio network environment to be experienced by the user equipment, and at least one second execution condition associated with a momentary traffic that the user equipment has to transmit and/or receive.

The user equipment may be preconfigured with the at least one second execution condition in advance of receiving the at least one first execution condition from a network node (e.g., from an MN). As another example, the user equipment may receive both the at least one first execution condition and the at least one second execution condition from signalling from a network node, whether in the same signalling or via separate signalling. In such cases, the user equipment may, during 901, receive the first set of conditions. These options are further discussed below.

In the present example, the momentary traffic may refer to a current traffic of the user equipment. The traffic may comprise data. The momentary traffic may refer to an instantaneous traffic. The momentary traffic may refer to traffic falling within a preconfigured duration of time.

During 902, the user equipment evaluates whether the at least one first execution condition has been fulfilled.

During 903, the user equipment evaluates whether the at least one second execution condition has been fulfilled.

During 904, the user equipment abstains from executing the secondary link establishment until the at least one second execution condition is fulfilled simultaneously with the at least one first execution condition.

The user equipment may, in response to evaluating that the at least one second execution condition is fulfilled when the at least one first execution condition is fulfilled, identify a target cell associated with the first set of conditions; and perform a random access procedure with the target cell. The at least one first and second execution conditions may be evaluated simultaneously or separately. For either of these evaluating examples, the user equipment may first evaluate/determine that the at least one first execution condition has been fulfilled, before later evaluating/determining that the at least one second execution condition has been fulfilled. As another example, the user equipment may first evaluate/determine that the at least one second execution condition has been fulfilled, before later evaluating/determining that the at least one first execution condition has been fulfilled Evaluating whether the at least one second execution condition has been fulfilled may comprise determining whether the user equipment has traffic to transmit to a network, and/or determining whether the user equipment is expecting to receive traffic from the network.

Said configuring the first set of conditions may comprise: receiving a first configuration comprising the first set of conditions from a first network node; and implemented the first configuration. In other words, the user equipment may receive the at least one first and second execution conditions during the same signalling operation, and evaluate whether those at least one first and second execution conditions are fulfilled.

The user equipment may receive the configuration comprising the first set of conditions in radio resource control reconfiguration signalling.

Said configuring the first set of conditions may comprise receiving the at least one first execution condition in different signalling to said at least one second execution condition; and executing the at least one first execution condition and said at least one second execution condition.

Said at least one second execution condition may be received via at least one a system information broadcast or via non-access stratum signalling.

FIG. 10 illustrates operations that may be performed by a first network node. The first network node may correspond to the first network node mentioned in relation to FIG. 9. The first network node may comprise a master node.

During 1001, the first network node prepares a first set of conditions for a user equipment to autonomously implement (e.g., to evaluate) during a Conditional PSCell addition, CPA, and/or a Conditional PSCell change, CPC, wherein the first set of conditions comprises at least one first execution condition associated with a quality of a radio network environment to be experienced by the user equipment, and at least one second execution condition associated with a momentary traffic that the user equipment has to transmit and/or receive.

During 1002, the first network node signals the first set of conditions to the user equipment.

The preparing may comprise: signalling, to a second network node, a request comprising an indication of a plurality of cells that may be prepared for the user equipment in advance of the primary secondary cell change operation; receiving, from the second network node, respective indications of at least one cell of said plurality of cells, each of said selected cells having a respective associated at least one first execution condition; and forming the first set using the selected cells and their respective associated at least one first execution condition.

Signalling the first set of conditions may comprise signalling the at least one first execution condition to the user equipment using different signalling to the signalling used for signalling said at least one second execution condition.

Signalling the first set of conditions may comprise signalling the at least one first execution condition to the user equipment using the same signalling as used for signalling said at least one second execution condition to the user equipment.

The first network node may signal the configuration comprising the first set of conditions in radio resource control reconfiguration signalling.

In both of the above-mentioned examples of FIGS. 9 and 10, the at least one first execution condition may comprise an entry condition and a leaving condition. In such a case, the at least one first execution condition may be considered to be fulfilled when, subsequent to the entry condition being fulfilled, the leaving condition has not been fulfilled.

The entry condition may comprise a duration of time for which the quality of the radio network environment measured by the user equipment should exceed a predetermined threshold amount in order for the at least one first condition to be fulfilled.

Similarly, in both of the above-mentioned examples of FIGS. 9 and 10, the at least one second execution condition may comprise a respective entry condition and a respective leaving condition. In such a case, the at least one second execution condition may be considered to be fulfilled when, subsequent to the respective entry condition being fulfilled, the respective leaving condition has not been fulfilled.

The entry condition may comprise a duration of time for which the quality of the radio It is understood that the above-mentioned The above-described mechanisms allow for a UE to withhold from executing a CPC and/or CPA procedure until the UE determines that the UE expects to transmit or receive data.

This has a number of different advantages. For example, the UE may save power by avoiding performing unnecessary executions of CPA and/or CPC configurations. This is especially useful where the UE is moving through an area covered by at least one small cell (e.g., by a femto cell and/or pico cell).

Further, the reduction in the number of CPA/CPC configuration executions results in less signalling overhead over the radio and network interfaces, relative to the example of FIG. 6.

Figure 2:
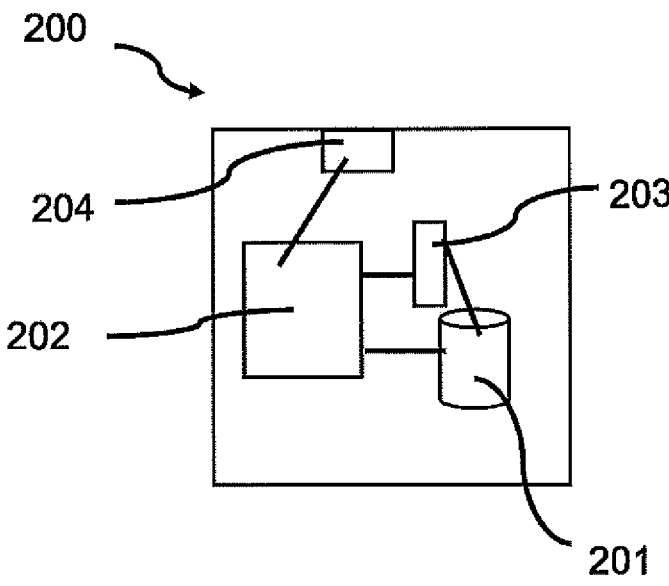
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR, and so forth. The control apparatus may be integrated with or external to a node or module of a core network or RAN. In some examples, base stations comprise a separate control apparatus unit or module. In other examples, the control apparatus can be another network element, such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions.

Figure 3:
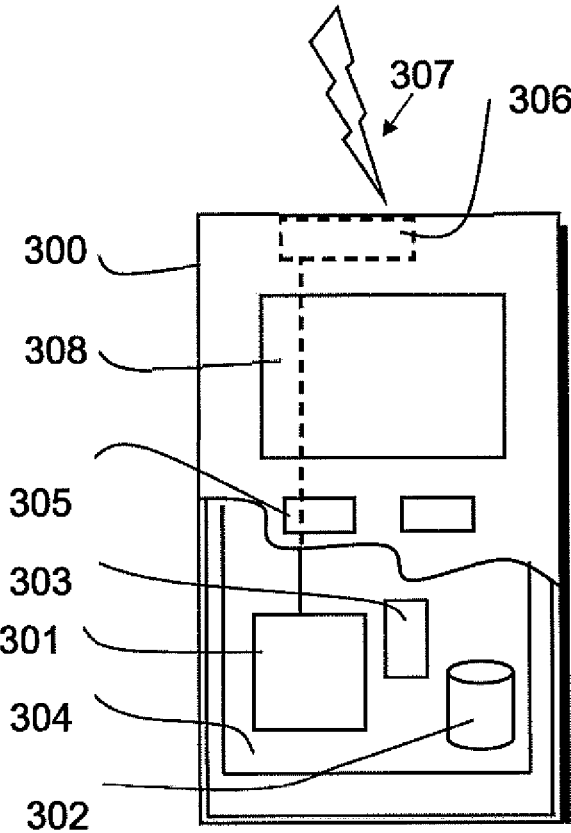
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is referred to as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. As described herein, the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided, for example, by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of Tasks it is designed to perform, including control of access to and communications with access systems and other communication devices. The data processing, storage and other relevant control apparatus can be provided on an appropriate circuit board and/or in chip-sets. This feature is denoted by reference 304. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
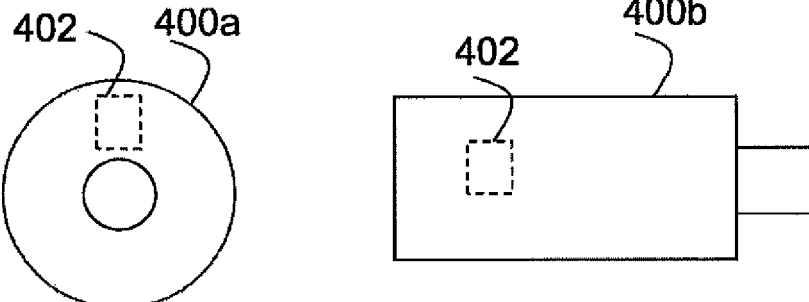
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 9 and/or FIG. 10, and/or methods otherwise described previously.

As provided herein, various aspects are described in the detailed description of examples and in the claims. In general, some examples may be implemented in hardware or special purpose circuits, software, logic or any combination thereof. For example, some aspects may be implemented in hardware, while other aspects may be implemented in firmware or software which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in FIG. 9 and/or FIG. 10, and/or otherwise described previously, may represent program steps, or interconnected logic circuits, blocks and functions, or a combination of program steps and logic circuits, blocks and functions. The software may be stored on such physical media as memory chips, or memory blocks implemented within the processor, magnetic media (such as hard disk or floppy disks), and optical media (such as for example DVD and the data variants thereof, CD, and so forth).

The memory may be of any type suitable to the local technical environment and may be implemented using any suitable data storage technology, such as semiconductor-based memory devices, magnetic memory devices and sys-tems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multicore processor architecture, as nonlimiting examples.

Additionally or alternatively, some examples may be implemented using circuitry. The circuitry may be configured to perform one or more of the functions and/or method steps previously described. That circuitry may be provided in the base station and/or in the communications device and/or in a core network entity.

As used in this application, the term "circuitry" may refer to one or more or all of the following:
  (a) hardware-only circuit implementations (such as implementations in only analogue and/or digital circuitry);
  (b) combinations of hardware circuits and software, such as:
    (i) a combination of analogue and/or digital hardware circuit(s) with software/firmware and
    (ii) any portions of hardware processor(s) with software (including digital signal processor(s)), software, and memory(ies) that work together to cause an apparatus, such as the communications device or base station to perform the various functions previously described; and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of non-limiting examples a full and informative description of some examples. However, various modifications and adaptations may become apparent to those skilled in the relevant arts in view of the foregoing description, when read in conjunction with the accompanying drawings and the claims. However, all such and similar modifications of the teachings will still fall within the scope of the claims.

In the above, different examples are described using, as an example of an access architecture to which the described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 5:
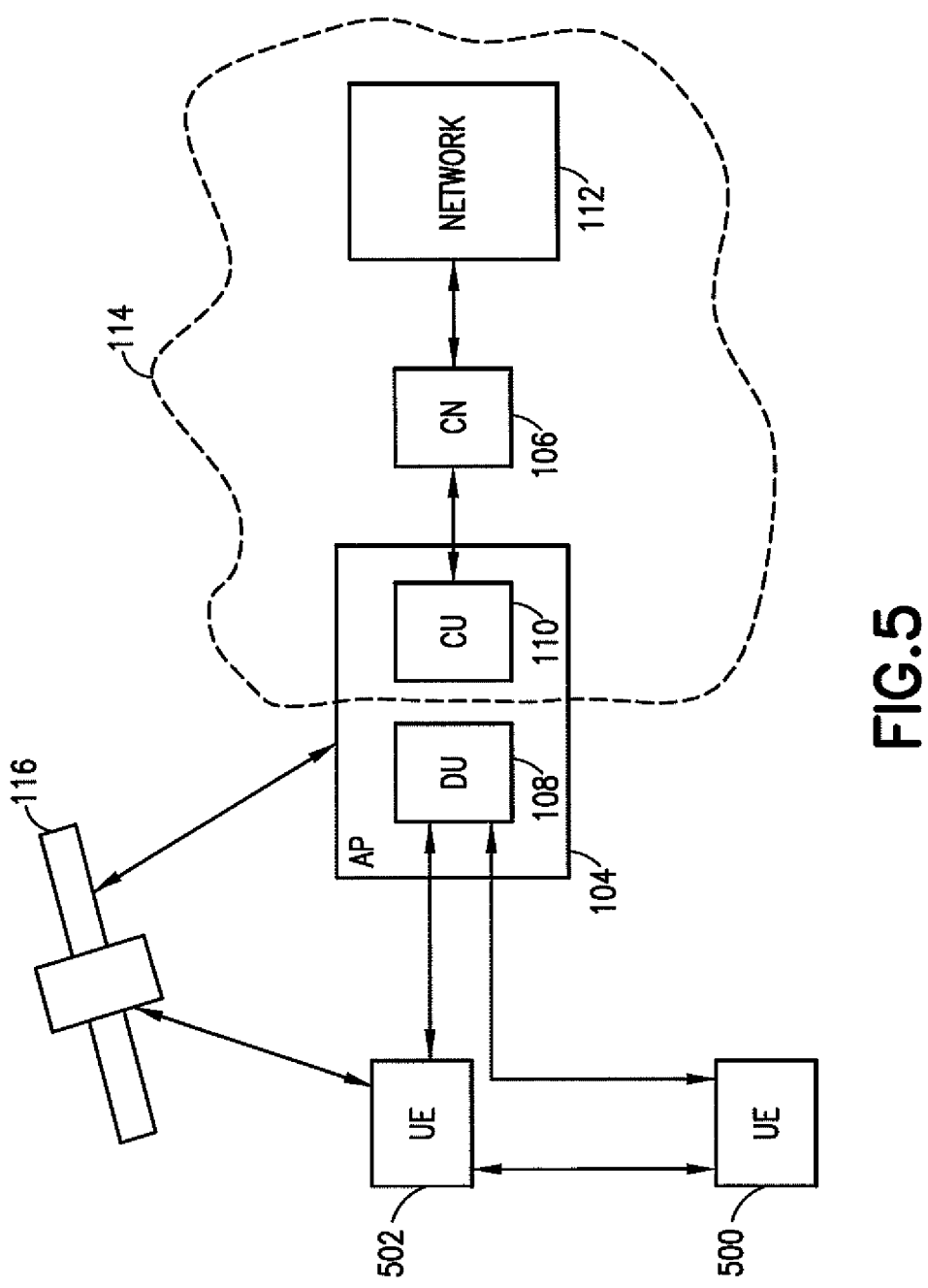
FIG. 5 shows a schematic representation of a network.

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504. The node 504 is further connected to a core network 506. In one example, the node 504 may be an access node such as (e/g)NodeB serving devices in a cell. In one example, the node 504 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 506 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The LTE network architecture is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoI P network, or the Internet, or a private network, or utilize services provided by them. The communication network may also be able to support the usage of cloud services, for example at least part of core network operations may be carried out as a cloud service (this is depicted in FIG. 5 by "cloud" 514). This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 5 may provide any kind of these cells. A cellular radio system may be implemented as a multilayer network including several kinds of cells.

The invention claimed is:

1. A user equipment, the user equipment comprising at least one processor and at least one memory including code for one or more programs, the at least one memory and the code configured, with the at least one processor, to cause the user equipment at least to:

configure a first set of conditions for autonomously executing a secondary link establishment during a conditional primary secondary cell addition and/or a conditional primary secondary cell change, wherein the first set of conditions comprises at least one first execution condition associated with a quality of a radio network environment to be experienced by the user equipment, and at least one second execution condition associated with a momentary traffic that the user equipment has to transmit and/or receive;

evaluate whether the at least one first execution condition has been fulfilled;

evaluate whether the at least one second execution condition has been fulfilled;

abstain from executing the secondary link establishment until the at least one second execution condition is fulfilled simultaneously with the at least one first execution condition; and in response to evaluating that the at least one second execution condition is fulfilled when the at least one first execution condition is fulfilled:

identify a target cell associated with the first set of conditions; and perform a random access procedure with the target cell.

2. The user equipment as claimed in claim 1, wherein said evaluating whether the at least one second execution condition has been fulfilled comprises determining whether the user equipment has traffic to transmit to a network, and/or determining whether the user equipment is expecting to receive traffic from the network.

3. The user equipment as claimed in claim 1, wherein said configuring the first set of conditions comprises:

receiving a first configuration comprising the first set of conditions from a first network node; and implementing the first configuration.

4. The user equipment as claimed in claim 1, wherein the at least one memory and the code are configured, with the at least one processor, to further cause the user equipment at least to;

receive a first configuration comprising the first set of conditions in radio resource control reconfiguration signalling.

5. The user equipment as claimed in claim 1, wherein said configuring the first set of conditions comprises receiving the at least one first execution condition in different signalling to said at least one second execution condition; and implementing the at least one first execution condition and said at least one second execution condition.

6. The user equipment as claimed in claim 5, wherein said at least one second execution condition is received via at least one a system information broadcast or via non-access stratum signalling.

7. A first network node, the first network node comprising at least one processor and at least one memory including code for one or more programs, the at least one memory and the code configured, with the at least one processor, to cause the first network node at least to:

prepare a first set of conditions for a user equipment to autonomously execute during a conditional primary secondary cell addition and/or a conditional primary secondary cell change, wherein the first set of conditions comprises at least one first execution condition associated with a quality of a radio network environment to be experienced by the user equipment, and at least one second execution condition associated with a momentary traffic that the user equipment has to transmit and/or receive; and signal the first set of conditions to the user equipment, wherein the signalling of the first set of conditions comprises signalling both the at least one first execution condition to the user equipment and said at least one second execution condition to the user equipment.

8. The first network node as claimed in claim 7, wherein the preparing comprises:

signalling, to a second network node, a request comprising an indication of a plurality of cells that may be prepared for the user equipment in advance of the primary secondary cell change operation;

receiving, from the second network node, respective indications of at least one cell of said plurality of cells, each of said selected cells having a respective associated at least one first execution condition; and forming the first set using the selected cells and their respective associated at least one first execution condition.

9. The first network node as claimed in claim 7, wherein the signalling of the first set of conditions comprises signalling the at least one first execution condition to the user equipment while using different signalling for signalling said at least one second execution condition.

10. The first network node as claimed in claim 7, wherein the first network node is configured to signal a configuration comprising the first set of conditions in radio resource control reconfiguration signalling.

11. The first network node as claimed in claim 7, wherein the at least one first execution condition comprises an entry condition and a leaving condition, and wherein the at least one first execution condition is fulfilled when, subsequent to the entry condition being fulfilled, the leaving condition has not been fulfilled.

12. The first network node as claimed in claim 11, wherein the entry condition comprises a duration of time for which the quality of the radio network environment measured by the user equipment should exceed a predetermined threshold amount in order for the at least one first condition to be fulfilled.

13. A method for a user equipment, the method comprising:

configuring, at the user equipment, a first set of conditions for autonomously executing a secondary link establishment during a conditional primary secondary cell addition and/or a conditional primary secondary cell change, wherein the first set of conditions comprises at least one first execution condition associated with a quality of a radio network environment to be experienced by the user equipment, and at least one second execution condition associated with a momentary traffic that the user equipment has to transmit and/or receive;

evaluating whether the at least one first execution condition has been fulfilled;

evaluating whether the at least one second execution condition has been fulfilled;

abstaining from executing the secondary link establishment until the at least one second execution condition is fulfilled simultaneously with the at least one first execution condition; and in response to evaluating that the at least one second execution condition is fulfilled when the at least one first execution condition is fulfilled:

identifying a target cell associated with the first set of conditions; and performing a random access procedure with the target cell.

14. A non-transitory computer readable medium comprising instructions which, when executed by an apparatus, cause the apparatus to perform the method of claim 13.

15. The method of claim 13, wherein said evaluating whether the at least one second execution condition has been fulfilled comprises determining whether the user equipment has traffic to transmit to a network, and/or determining whether the user equipment is expecting to receive traffic from the network.

16. The method of claim 13, wherein said configuring the first set of conditions comprises:

receiving a first configuration comprising the first set of conditions from a first network node; and implementing the first configuration.

17. The method of claim 13, further comprising:

receiving a first configuration comprising the first set of conditions in radio resource control reconfiguration signalling.

18. The method of claim 13, wherein said configuring the first set of conditions comprises receiving the at least one first execution condition in different signalling to said at least one second execution condition; and implementing the at least one first execution condition and said at least one second execution condition.

19. The method of claim 18, wherein said at least one second execution condition is received via at least one a system information broadcast or via non-access stratum signalling.

* * * * *